(12) United States Patent
Costabel (10) Patent No.: US 8,453,973 B2
(45) Date of Patent: *Jun. 4, 2013

(54) PLUG MOUNTING

(75) Inventor: Sascha Costabel, Otisheim (DE)

(73) Assignee: SFS intec Holding AG, Heerbrugg (CH)

( * ) Notice: Subject to any disclaimer, the term of this patent is extended or adjusted under 35 U.S.C. 154(b) by 169 days.

This patent is subject to a terminal disclaimer.

(21) Appl. No.: 12/745,038

(22) PCT Filed: Dec. 17, 2008

(86) PCT No.: PCT/EP2008/067702
§ 371 (c)(1),
(2), (4) Date: May 27, 2010

(87) PCT Pub. No.: WO2009/080641
PCT Pub. Date: Jul. 2, 2009

(65) Prior Publication Data
US 2010/0303542 A1    Dec. 2, 2010

(30) Foreign Application Priority Data
Dec. 21, 2007    (DE) .......................... 10 2007 061 926

(51) Int. Cl.
*B64C 1/14*    (2006.01)
*F16B 21/00*    (2006.01)
(52) U.S. Cl.
USPC ......... 244/129.4; 403/326; 244/119; 244/131
(58) Field of Classification Search
USPC ................. 411/352, 353, 356, 522, 523, 542, 411/552–554, 999; 292/340, 341.15, 143, 292/173; 403/326, 329; 244/118.5, 117 R, 244/119, 131, 132, 129.4, 129.5; 439/152, 439/660
See application file for complete search history.

(56) References Cited

U.S. PATENT DOCUMENTS 1,535,478 A * 4/1925 Keeler ........................... 292/173
3,002,365 A * 10/1961 Liljequist ........................ 464/32
(Continued)

FOREIGN PATENT DOCUMENTS
DE        29920497        2/2000
DE      202004018340      5/2006
(Continued)

*Primary Examiner* — Victor MacArthur
(74) *Attorney, Agent, or Firm* — Volpe and Koenig, P.C.

(57) ABSTRACT

A plug mounting (50) is provided as a combination of a plug (10) and a mount (30), for the detachable mounting of an equipment part, such as an inner panel, to a supporting frame, such as an aircraft fuselage. The plug (10) has a mounting pin (12), which has an annular groove (25) on one end, which can be engaged with a slide (34) of the mount (30), which is under spring pretension. The mounting pin (12) can be connected to the foundation by a damping element. The mount (30) is fastened to the housing (32) on the equipment part. The mount (30) has an eccentric lever (42) for unlocking the plug (10) by displacing the slide (34) against the spring pretension. The arrangement is made so that only the mounting pin (12) of the plug (10) needs to be inserted into the opening of the housing of the mount (30). It is not important whether an opening in the slide (34), into which the mounting pin (12) is to be inserted, is precisely aligned therewith, because the slide (34) is pushed against the spring pretension by one end of the mounting pin (12), wherein the spring pretension subsequently ensures that the slide (34) is latched in the annular grove of the mounting pin.

7 Claims, 5 Drawing Sheets

U.S. PATENT DOCUMENTS

| | | | |
|---|---|---|---|
| 3,182,367 A | | 5/1965 | Hamann et al. |
| 4,504,167 A | | 3/1985 | Nakanishi |
| 4,597,599 A | * | 7/1986 | Bisbing .......................... 292/174 |
| 4,828,299 A | * | 5/1989 | Poe ................................ 292/139 |
| 6,149,213 A | * | 11/2000 | Sokurenko et al. ............ 292/340 |
| 6,409,446 B1 | * | 6/2002 | Schwarz ........................ 411/552 |
| 6,641,325 B2 | * | 11/2003 | Schwarz ........................ 403/329 |
| 6,789,826 B1 | * | 9/2004 | Helgenberg et al. ..... 292/341.15 |
| 6,817,637 B1 | * | 11/2004 | Anderson ..................... 292/340 |
| 7,070,246 B2 | * | 7/2006 | Chen ........................ 301/111.07 |
| 7,179,039 B2 | * | 2/2007 | Schwartz et al. .............. 411/542 |
| 7,208,853 B2 | * | 4/2007 | Terrill et al. ..................... 310/51 |
| 7,984,936 B2 | * | 7/2011 | Lee ................................ 292/150 |
| 2008/0273922 A1 | * | 11/2008 | Homner ........................ 403/327 |
| 2010/0304588 A1 | * | 12/2010 | Costabel et al. .............. 439/152 |

FOREIGN PATENT DOCUMENTS

| | | |
|---|---|---|
| DE | 202006004081 | 9/2007 |
| EP | 1104853 | 9/2002 |
| FR | 2446947 | 8/1980 |

* cited by examiner

PLUG MOUNTING

BACKGROUND

The invention relates to a plug mounting for a detachable fastening of an equipment part, such as an inner panel to a supporting structure, such as an aircraft fuselage, using a plug having a mounting pin, comprising at one end at least one recess that can be engaged by a clip of a fastener that can be mounted to the equipment part and at the other end an elastically receding, washer-shaped damper for damping oscillations and for mounting the plug to the sub-frame, arranged on the mounting pin between a mounting washer and an axially displaceable washer.

Such plug mountings are known, for example from the utility patent DE 299 20 497 U1. The mounting arrangement damping oscillations, here called a plug mounting, comprises a spring arrangement as a clip having two opposite spring arms. The mounting pin has two diametrically opposite engagement recesses (grooves) as recesses for the engagement of the spring arms. At its end opposite thereto the mounting pin has a head embodied like a screw head and provided with a screwdriver slot. The damper is an annular oscillation damper comprising a peripheral groove, in which the edge is arranged of an opening of one of two components to be connected to each other. Due to its elasticity, the damper simultaneously allows the compensation of tolerances of the components to be connected. In the annular oscillation damper the fastening pin is guided in an additional socket. The assembly and disassembly of this known plug mounting is difficult because during the assembly the openings of equipment parts to be connected to each other must be aligned rather precisely to each other for the mounting pin, which is preassembled in the opening of one of the parts, to be inserted into the opening of the other part, below which the arrangement of the retaining spring is mounted in a fixed manner. Furthermore, the spring arms can only latch into their engagement recesses in the mounting pin in a precisely predetermined position, thus during the assembly not only the above-mentioned openings must be aligned to each other but subsequently the mounting pin must also be rotated with the help of a tool until the spring arms have latched in the engagement recesses. During the disassembly of this known plug mounting again a tool is necessary, because in order to loosen the connection the mounting pin must be rotated by approximately 90°. Here, the ends of the spring arms are spread apart to an extent equivalent to the diameter of the mounting pin. In this unlatched position then one of the parts including the damper and the mounting pin can be released from the opened arrangement of retaining springs, which is connected to the other part in a fixed manner. The embodiment of the engagement recesses in the known mounting pin requires that the force is limited that can be applied safely and over an extended period of time. Although this known plug mounting is used in airplanes for mounting inner panels to the airplane fuselage, presently the prior art also uses many different plug mountings for various inner cover panels. Although this allows a simple assembly and disassembly, however, it requires the use of tools.

During the development of aircraft cabins of new airplane types, such as Airbus A350, it has been attempted to design the elements to be fastened to the fuselage, such as toilets, board kitchens, airplane seats, cabin networks, cabin lighting, and air jets, each as complete cabin modules, with all their connection parts being embodied as flexible, standardized interfaces, if possible, and utilizing simplified mounting concepts that facilitate the assembly and disassembly without any use of tools (cf. the essay "Cabin Customization—New approach for A350", magazine One, German issue, Dec. 18, 2006, page 23.) Additionally, it should be possible on a short notice to reconfigure an existing solution, such as changing the cabin equipment for a long-distance flight, into the cabin equipment for a short-distance flight, e.g. The standardized interfaces should be applicable equally to all aircraft categories. Additionally, it should be ensured, here that the standardized interfaces safely prevent any rattling noise of the components connected to each other.

SUMMARY

The object of the invention is to provide a plug mounting, by which the above-mentioned problems of prior art can be avoided, particularly the use of tools for the assembly and disassembly of the plug mounting and the creation of the plug mounting can occur without the openings of components to be connected to each other being precisely aligned to each other.

This objective is attained according to the invention in a plug mounting of the type mentioned at the outset in that the recess comprises an annular groove with two radially embodied lateral groove walls and that the clip is a spring biased slide, which is supported in a housing of a holder such that during the insertion of the mounting pin into an opening of the housing, one end of the mounting pin is displaced in reference to said opening against the spring bias, and subsequently it is latched in the annular groove of the mounting pin by the spring bias.

The connection achieved with the plug mounting according to the invention can be more easily assembled and disassembled than the plug mountings of prior art described at the outset, because the opening of the housing of the holder can be sized and positioned such that a precise mutual alignment of the openings of the two assembly parts to be connected to each other during the assembly is not necessary. In a plug mounting embodied according to the invention only the mounting pin of the plug on the assembly part to be mounted is provided, which needs to be inserted into the opening of the housing of the holder connected to the other part. Here, it is irrelevant if an opening in the slide, into which the mounting pin must be inserted, is precisely aligned thereto, because according to the invention the slide is displaced by one end of the mounting pin against the spring bias, with the spring bias then ensuring that the slide latches in the annular groove of the mounting pin. Furthermore, no tools are necessary, either for the assembly or for the disassembly, because the creation of the connection occurs simply by way of insertion according to the principle "plug and play" or "snap and click." The loosening of the plug mounting according to the invention can occur, for example, simply by a finger pressing against a particular handle in order to push the slide back against the spring pretension to such an extent that it releases the mounting pin.

Advantageous embodiments of the invention are described in the dependent claims.

In one embodiment of the plug mounting according to the invention, the end of the mounting pin adjacent to the annual groove is embodied as a spherically rounded dome, so the plug mounting can be assembled with relatively little force. The spherically rounded dome allows the slide to be easily pushed aside inside the housing of the holder.

In another embodiment the plug mounting according to the invention, the fastening washer and the glide washer can be supported on the mounting pin at a stop, detachable from the mounting pin, and/or at a shoulder formed at the mounting pin, the damper can be assembled on the mounting pin in a simple fashion and then it can be pre-assembled to a subframe or the like.

In one embodiment of the plug mounting according to the invention, the opening represents a bore or an oblong hole, optionally a connection can be created in which the mounting pin is subsequently no longer displaceable, or only over the length of the oblong hole.

In another embodiment of the plug mounting according to the invention, an eccentric lever is used to unlatch the pin from the holder by displacing the slide against the spring pre-tension, the connection can be loosened in a particularly simple fashion.

In another embodiment of the plug mounting according to the invention, the slide comprises an opening that can be aligned to the opening of the housing having an edge that can engage the annular groove of the mounting pin, by which a secure engagement of the slide in the annular groove of the mounting pin can be ensured in a particularly simple fashion.

In another embodiment of the plug mounting according to the invention, a first stop is embodied on the housing for the eccentric lever such that during the mutual contact thereof, the openings of the housing and the slide are aligned to each other for disassembling, and the pin of this connection can be loosened "blindly", so to speak, simply by switching the eccentric lever.

In another embodiment of the plug mounting according to the invention, a second stop for the eccentric lever is embodied at the housing such that during mutual contact thereof the openings of the housing and the slide are off-set in reference to each other for inserting and locking the mounting pin, so the mounting can be positioned in a particularly simple fashion, where the connection can be created by applying pressure upon the mounting pin.

In another embodiment of the plug mounting according to the invention, two helical compression springs, arranged between the housing and the slide, create the spring bias so that an even guiding of the slide is ensured in the housing.

In another embodiment the plug mounting according to the invention, a distance between the annular groove of the mounting pin and the bottom of the glide washer of the mounting pin or the bottom of the equipment part arranged underneath the glide washer on the mounting pin facing the annular groove is selected smaller than a distance between a top of the slide facing it and a support surface of the housing on which the bottom of the glide washer or the equipment part shall rest such that in the locked position of the plug mounting, the damper is slightly compressed in the axial direction, and high pressure can be maintained in a simple fashion in the connection created by the plug mounting. This way, play and consequently rattling noise is avoided in a secure manner.

BRIEF DESCRIPTION OF THE DRAWINGS

In the following, exemplary embodiments of the invention are explained in greater detail with reference to the drawings.

Shown are.

DETAILED DESCRIPTION OF THE PREFERRED EMBODIMENTS

An embodiment of a plug mounting according to the invention, marked 50 in its entirety, is shown in FIGS. 3-11 in locked and unlocked states in various views, which is discussed in greater detail in the following. The plug mounting 50 serves for a detachable fastening of an equipment part 52 to a supporting frame 54. The equipment part 52 may represent e.g., the inner cover of the cabin of an airplane. The supporting frame 54 may be the airplane fuselage, for example. It may just as well represent equivalent parts of a motor vehicle. The plug mounting 50 comprises a plug, in its entirety marked 10 and shown in detail in FIG. 1, and a mounting, in its entirety marked 30 and shown in detail in FIG. 2, which in the following are first described in detail.

Figure 1:
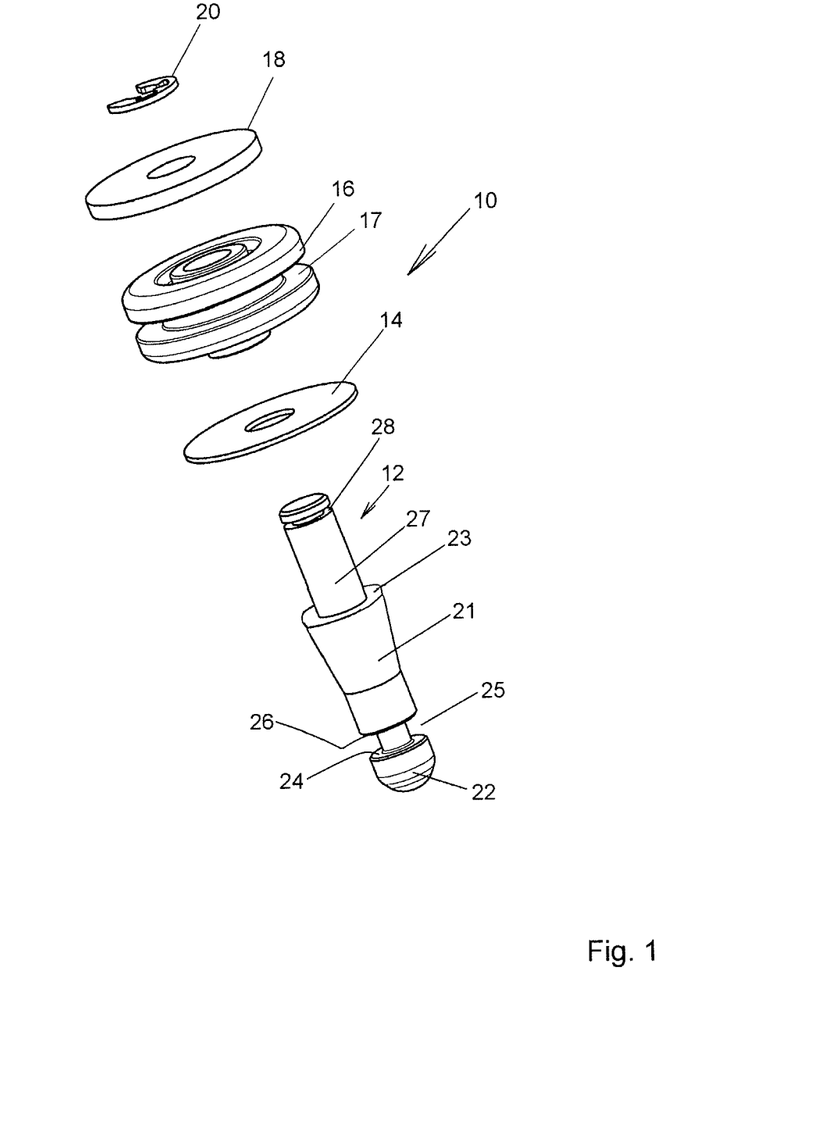
FIG. 1 is an exploded isometric view of an embodiment of the plug according to the invention.

FIG. 1 shows an exemplary embodiment of the plug 10 according to the invention in an exploded isometric view. The plug 10 comprises a mounting pin 12, a glide washer 14, a washer-shaped damper 16, a mounting washer 18, and a circular spring or cir-clip 20. The damper comprises an elastic material, e.g., an elastomer. It serves to dampen oscillations and to mount the plug 10 to the supporting frame 54. An end of the mounting pin 12 is embodied as a spherically rounded dome 22. Adjacent to the dome 22 the mounting pin 12 comprises a recess representing an annular groove 25 with two radially embodied lateral groove walls 24 and 26. Adjacent thereto, the mounting pin 12 comprises a conically expanded shaft section 21 such that a shoulder 23 is formed at the mounting pin 12. However, the conical embodiment of the shaft section 21 is not explicitly required for the invention. The shaft section 21 may also be embodied in a simple cylindrical shape, however enlarged in its diameter in reference to the shaft section 27, as illustrated in FIGS. 3-11. The glide washer 14 is supported on the shoulder 23. The mounting washer 18 is supported, on the one side on the cir-clip 20 and on the other side on the damper 16. The damper 16 in turn is supported with its bottom on one side on the glide washer 14. When the damper 16, the glide washer 14, the mounting washer 18, and the cir-clip 20 are assembled on the mounting pin 12, the glide washer 14 is supported on the shoulder 23 and all above-mentioned parts are mutually in contact. When in FIG. 1 pressure is applied upon the upper end of the mounting pin 12 while the plug 10 with the glide washer 14 is supported on the mount 30 it moves to the same extent as the elastic damper 16 is compressed, the glide washer 14 moves upwards on a shaft section 27, provided with a smaller diameter than the shaft section 21, in the direction toward the cir-clip 20, which here forms a stop for the mounting washer 18 and hinders its upward motion. For the disassembly of the parts arranged on the shaft section 27, the cir-clip 20 can be loosened by being pulled out of a groove 28 at the end of the shaft section 27. The cir-clip 25 of the mounting pin 12 can engage a clip for the assembly of the plug 10 in the holder 30, which now is described in greater detail with reference to FIG. 2.

Figure 2:
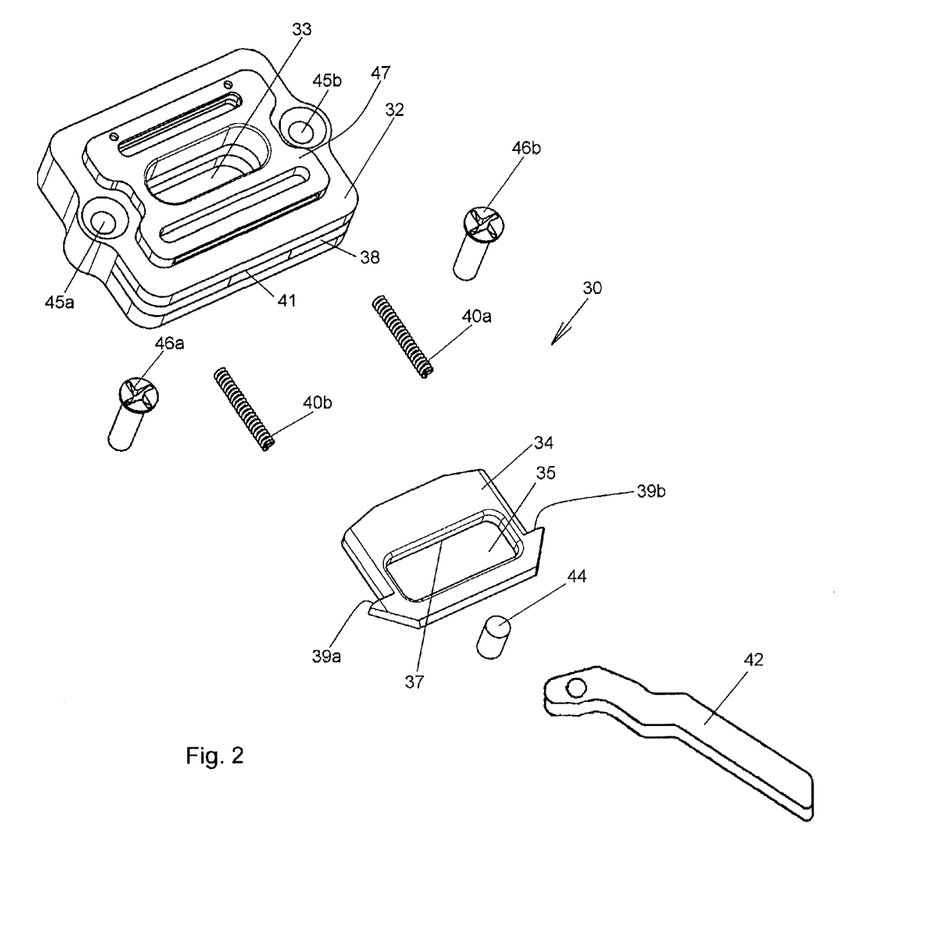
FIG. 2 is an exploded isometric view of an embodiment of the mounting according to the invention.

FIG. 2 shows in an exploded isometric view an embodiment of the holder 30 according to the invention. The holder 30 has a housing 32, in which a spring biased slide 34 is supported as the above-mentioned clip. The housing 32 has a central opening 33, which in the exemplary embodiment is formed as an oblong hole. The opening 33 could also be simply embodied as a bore. The opening 33 completely penetrates the housing 32, which is clearly discernible from FIG. 2. The slide 34 is supported in a recess 38 of the housing 32 that opens laterally. The slide 34 has an opening 35 that can be aligned with the opening 33 of the housing 32. At the sides, the slide 34 has two shoulders 39a, 39b, by which it is supported against two helical springs 40a and/or 40b arranged in the recess 38 of the housing 32, best discernible in the FIGS. 4, 7, and 10, which is discussed in greater detail in the following. The opening 35 of the slide 34 has an edge 37, which can be made to engage the annular groove 25 of the mounting pin 12. By the pre-tension of the helical springs 40a, 40b, the edge 37 is constantly biased in the direction toward the lateral opening of the housing of the recess 38. In the lateral opening of the housing of the recess 38 a stop 41 is provided for an eccentric lever 42 to unlatch the holder 30 by displacing the slide 34 against the spring bias applied by the helical springs 40a, 40b. The eccentric lever 42 cooperates with the stop 41 according to the illustration in FIG. 7 or with a stop 43 according to the illustration in FIG. 10. For this purpose, the eccentric lever 42 can be pivoted around a pin 44 in the housing 32.

Figure 6:
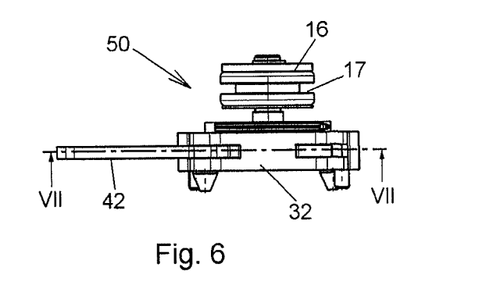
FIG. 6 is a view of the plug mounting according to FIG. 3, however in the unlocked state.
Figure 7:
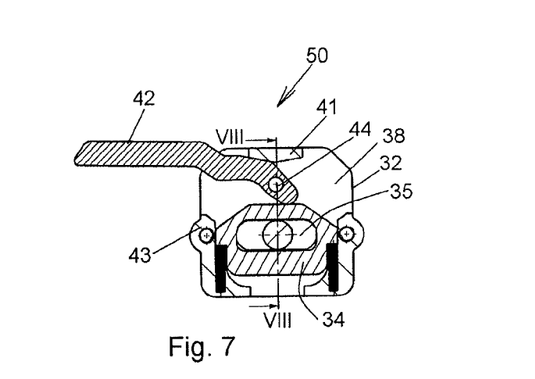
FIG. 7 is a cross-sectional view according to the line VII-VII in FIG. 6.

The stop 41 at the housing and the eccentric lever 42 are embodied such that, when both are in a mutual contact, the opening 33 of the housing 32 and the opening 35 of the slide 34 are aligned to each other, as discernible in FIG. 7. Further, the stop 43 at the housing 32 and the eccentric lever 42 are embodied such that in a mutual contact thereof, the opening 33 of the housing 32 and the opening 35 of the slide 34 are off-set in reference to each other, as discernible in FIGS. 4 and 10. In the exemplary embodiment shown, two bores 45a, 45b and two counter-sunk screws 46a, 46b are provided to fasten the housing 32 to the equipment part 52. When the mounting pin 12 is inserted into the opening 33 of the housing the end of the mounting pin, provided with the dome 22, displaces the slide 34 against the spring bias and subsequently latches in the annular groove 25 of the mounting bolt 12 due to the spring bias, which is now described in greater detail with reference to FIGS. 3-11.

A plug mounting assembly shown here is marked 50 in its entirety and represents a combination of the plug 10 and the holder 30. According to the illustration in FIG. 11 the arrangement is made such that a distance a between the annular groove 25 of the mounting pin 12 and a bottom of the glide washer 14 of the mounting pin facing the annular groove 25 or the bottom of an equipment part (not shown) arranged under the glide washer 14 on the mounting pin 12 is selected smaller than a distance a' between a facing top of the slide 34 and a support surface 47 of the housing 32, on which the bottom of the glide washer 14 or the equipment part (not shown) are supported such that in the closed status of the plug mounting 50 the damper 16 is slightly compressed in the axial direction. The distance by which the damper 16 is compressed here, may amount to 0.4 mm, for example. Although the plug 10 can still be displaced in reference to the holder 30, however it is subject to the pre-tension of the damper 16 such that any development of noise by the two parts 52 and 54, connected to each other via the plug mounting 50, is prevented.

Figure 3:
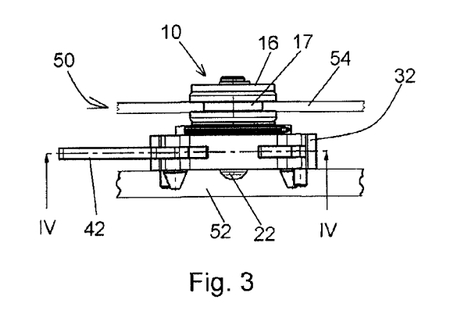
FIG. 3 is a side view of an exemplary embodiment of the plug mounting according to the invention in the locked state.
Figure 4:
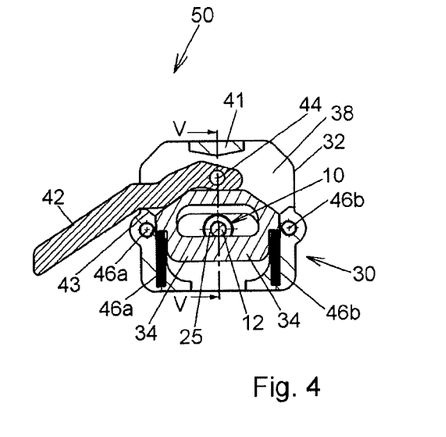
FIG. 4 is a cross-sectional view according to the line IV-IV in FIG. 3.
Figure 5:
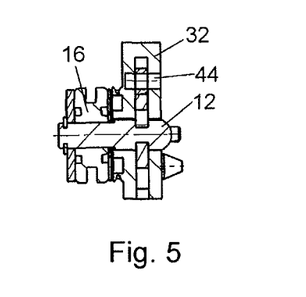
FIG. 5 is a cross-sectional view according to the line V-V in FIG. 4.

FIG. 3 shows an exemplary embodiment of the plug mounting 50 according to the invention in a locked state in a side view, in which the slide 34 with the edge 37 of the opening 35 is latched in an annular groove 25 of the mounting pin 12. In FIG. 3 it is discernible that the supporting frame 54 with the edge of a bore is accepted in a form-fitting fashion in the circumferential groove 17 of the damper. As described above, the holder 30 is fastened with its housing 32 on a side of the equipment part 52 via countersunk screws 46a, 46b. The type of locking between the slide 34 and the mounting pin 12 is easily discernible in FIG. 4, which represents a cross-sectional view according to the line IV-IV in FIG. 3, and in FIG. 5 representing a cross-sectional view according to the line V-V in FIG. 4.

Figure 8:
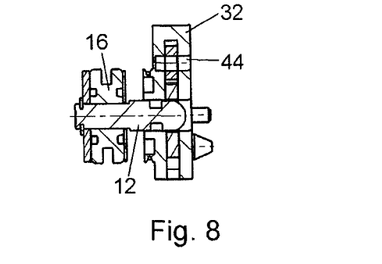
FIG. 8 is a cross-sectional view according to the line VIII-VIII in FIG. 7.

FIGS. 6-8 show the unlocked state, in which the mounting pin 12 can be disassembled. Here, in FIG. 6, the mounting pin 12 is embodied as shown in FIG. 3, however in the unlocked status. FIG. 7 is a cross-sectional view according to the line VII-VII in FIG. 6, and FIG. 8 represents a cross-sectional view according to the line VIII-VIII in FIG. 7. In the locked status according to the illustration in FIG. 4, the eccentric lever 42 is pivoted downward and contacts the stop 43. However, in FIG. 7 the eccentric lever 42 is pivoted upward and contacts the stop 41.

Figure 9:
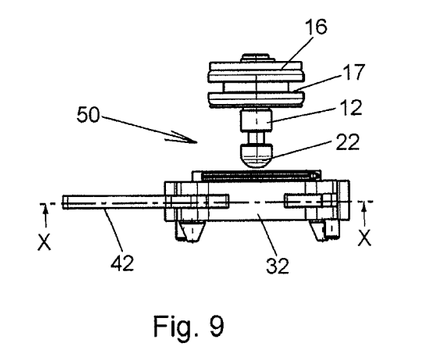
FIG. 9 is a view of the plug mounting according to FIG. 3, however in the resting state without any engagement of the mounting pin in the mounting.
Figure 10:
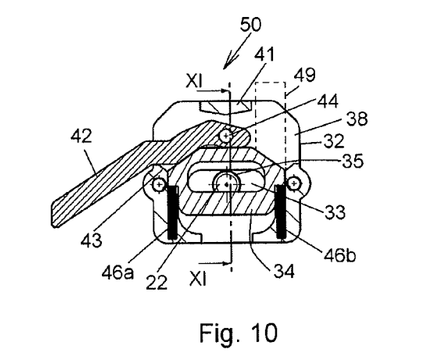
FIG. 10 is a cross-sectional view according to the line X-X in FIG. 9.
Figure 11:
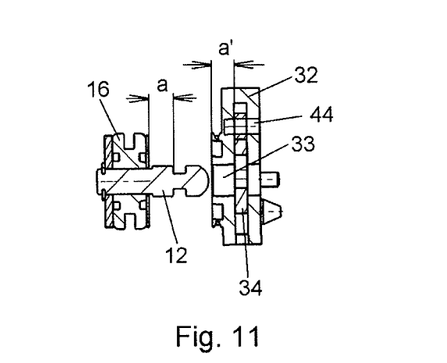
FIG. 11 is a cross-sectional view according to the line XI-XI in FIG. 10.

FIGS. 9-11 show the normal position of the plug mounting, in which the mounting pin 12 is not inserted into the housing 32, which is easily discernible in FIG. 9, the illustration of the plug mounting 50 seen in FIG. 3 is in the normal status, though. FIG. 10 represents a cross-sectional view according to the line X-X in FIG. 9, and FIG. 11 represents a cross-sectional view according to the line XI-XI in FIG. 10. In the normal state, similar to the locked state, the eccentric lever 42 contacts the stop 43, as discernible in FIG. 10. The unlocked status according to FIGS. 6-8 could be adjusted, instead of via an eccentric lever as the eccentric lever 42, also via a simple handle 49 (shown only in FIG. 10 in a dot-dash line.) The handle 49 would contact the slide 34 or be formed thereon and by activation of a pressing finger it would bring the slide 34 into the position shown in FIGS. 6-8.

LIST OF REFERENCE CHARACTERS

10 Plug
12 Mounting pin
14 Glide washer
16 Damper
17 Circumferential groove
18 Mounting washer
20 Cir-clip
21 Shaft section
22 Dome
23 Shoulder
24 Lateral groove wall
25 Annular groove
26 Lateral groove wall
27 Shaft section
28 Groove
30 Holder
32 Housing
33 Opening
34 Slide
35 Opening
37 Edge
38 Recess
39a, b Shoulders
40a, b Helical springs
41 Stop 42 Eccentric lever
43 Stop
44 Pin
45a, b Bores
46a, b Countersunk screws
47 Support surface
49 Handle
50 Plug mounting
52 Equipment part
54 Supporting frame

The invention claimed is:

1. An aircraft fuselage comprising: an inner cover panel and an assembly comprising a plug and holder for detachably mounting the inner cover panel to the aircraft fuselage, the plug comprising a mounting pin, having at a first end at least one recess, which is engageable with a clip of the holder which is mounted to the inner cover panel, and the mounting pin having at a second end an elastic, washer-shaped damper for damping oscillations and for mounting the plug to the aircraft fuselage, the elastic, washer-shaped damper is arranged on the mounting pin between a mounting washer and an axially displaceable glide washer, the recess is an annular groove (25) with two radially embodied lateral groove walls (24, 26), and the holder comprises a housing (32) with an opening (33), and the clip is a spring biased slide (34) supported in the housing (32) such that during insertion of the mounting pin (12) into the opening (33) of the housing (32), the spring biased slide (34) is displaced in reference to the opening (33) against a spring bias by the first end of the mounting pin (12) and is then movable to a position in which the spring biased slide (34) locks in the annular groove (25) of the mounting pin (12) due to the spring bias, and the opening (33) in the housing (32) is an oblong bore, which is elongated in a direction that is perpendicular to a direction of displacement of the slide, an eccentric lever (42) is movable on the housing (32) to displace the slide (34) against the spring bias for unlocking the spring biased slide from the annular groove (25), the slide (34) comprises an opening (35) that is oblong and is alignable with the opening (33) of the housing (32), having an edge (37) that is alignable with the annual groove (25) of the mounting pin (12), the opening (35) of the slide (34) being elongated in a direction that is perpendicular to the direction of displacement of the slide (34), and a first stop (41) is provided on the housing (32) for the eccentric lever (42) such that in a mutual contact thereof the openings (33, 35) of the housing (32) and the slide (34) are aligned for disengagement of the mounting pin (12).

2. The assembly according to claim 1, wherein the first end of the mounting pin (12) adjacent to the annular groove (25) is embodied as a spherically rounded dome (22).

3. The assembly according to claim 1, wherein the mounting washer (18) and the glide washer (14) are supported on the mounting pin (12) at a stop, detachable from the mounting pin (12), or a shoulder (23) formed on the mounting pin (12).

4. The assembly according to claim 3, wherein a distance ($\alpha$) between the annular groove (25) of the mounting pin (12) and a bottom of the glide washer (14) of the mounting pin (12) or a bottom of the inner panel cover arranged below the glide washer (14) on the mounting pin (12) facing the annular groove (25) is selected smaller than a distance (a') between a facing top of the slide (34) and a support surface (47) of the housing (32), on which a bottom of the glide washer (14) or the inner panel cover rests such that in a locked state of the assembly (50) the damper (16) is axially compressed.

5. The assembly according to claim 1, wherein a second stop (43) is provided on the housing (32) for the eccentric lever (42) such that in a mutual contact thereof the openings (33, 35) of the housing (32) and the slide (34) are off-set in reference to each other for inserting and locking the mounting pin (12).

6. The assembly according to claim 1, further comprising two helical springs (40a, 40b), arranged between the housing (32) and the slide (34) to create the spring bias.

7. The assembly according to claim 1, wherein a plurality of the holders are mounted on the inner panel cover.

* * * * *